United States Patent
Juhasz

(10) Patent No.: US 9,142,978 B2
(45) Date of Patent: Sep. 22, 2015

(54) QUEUE PRIORITIZATION FOR ELECTRIC VEHICLE CHARGING STATIONS

(71) Applicant: EV Connect, Inc., Culver City, CA (US)

(72) Inventor: Bradley Juhasz, Glendale, CA (US)

(73) Assignee: EV Connect, Inc., Culver City, CA (US)

( * ) Notice: Subject to any disclaimer, the term of this patent is extended or adjusted under 35 U.S.C. 154(b) by 395 days.

(21) Appl. No.: 13/670,347

(22) Filed: Nov. 6, 2012

(65) Prior Publication Data

US 2014/0125279 A1  May 8, 2014

(51) Int. Cl.
*H02J 7/00* (2006.01)
*B60L 9/00* (2006.01)
*B60W 10/24* (2006.01)
*B60L 3/12* (2006.01)
*B60L 11/18* (2006.01)

(52) U.S. Cl.
CPC ............... *H02J 7/0013* (2013.01); *B60L 3/12* (2013.01); *B60L 11/184* (2013.01); *B60L 11/1824* (2013.01); *B60L 11/1842* (2013.01); *B60L 11/1844* (2013.01); *B60L 11/1846* (2013.01); *B60L 11/1848* (2013.01); *B60L 11/1861* (2013.01); *H02J 7/00* (2013.01); *B60L 2230/16* (2013.01); *B60L 2240/72* (2013.01); *B60L 2240/80* (2013.01); *B60L 2250/12* (2013.01); *B60L 2250/14* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 30/12* (2013.01)

(58) Field of Classification Search
CPC ........................................................ H02J 7/0013
USPC .............. 320/109; 701/22; 180/65.1, 65.21, 180/65.29
See application file for complete search history.

(56) References Cited

U.S. PATENT DOCUMENTS

| 8,378,627 B2* | 2/2013 | Asada et al. ................ 320/109 |
| 8,604,750 B2* | 12/2013 | Turner et al. ................ 320/109 |
| 2009/0174365 A1* | 7/2009 | Lowenthal et al. ........... 320/109 |
| 2011/0031929 A1* | 2/2011 | Asada et al. ................ 320/109 |
| 2011/0239116 A1* | 9/2011 | Turner et al. ................ 715/705 |
| 2012/0109798 A1 | 5/2012 | Shelton et al. |
| 2012/0197693 A1 | 8/2012 | Karner et al. |

OTHER PUBLICATIONS

World Intellectual Property Organization, International Search Report and Written Opinion for International Application PCT/US2013/068210 mail date Jun. 23, 2014, pp. 1-9.

* cited by examiner

*Primary Examiner* — Richard V Muralidar
(74) *Attorney, Agent, or Firm* — SoCal IP Law Group LLP; Jonathan Pearce

(57) ABSTRACT

There is disclosed method of queue prioritization and an electric vehicle charging station, the method includes providing remote access to a queue for the electric vehicle charging station, the queue defining the order and duration of electric vehicles to be charged at the electric vehicle charging station, receiving a plurality of requests to utilize the electric vehicle charging station and entering those requests into the queue. The method further includes prioritizing the queue based upon parameters determined by an electric vehicle charging station operator, notifying a vehicle operator of their position at the top of the queue and enabling the electric vehicle charging station to begin charging a vehicle operated by the vehicle operator upon confirmation that the vehicle is present at the electric vehicle charging station.

20 Claims, 10 Drawing Sheets

QUEUE PRIORITIZATION FOR ELECTRIC VEHICLE CHARGING STATIONS

RELATED APPLICATION INFORMATION

This patent is related to the following co-pending applications:

U.S. patent application Ser. No. 13/693,839 filed Dec. 4, 2012 and entitled "ELECTRIC VEHICLE CHARGING STATION PROVISIONING".

U.S. patent application Ser. No. 13/670,352 filed Nov. 7, 2012 and entitled "MANAGEMENT OF ELECTRIC VEHICLE CHARGING STATION QUEUES".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to the prioritization of queues for electric vehicle charging stations.

2. Description of the Related Art

The owners of plug-in electric and hybrid electric vehicles, which will be referred to herein as PEVs, typically have a dedicated charging station at the home or other location where the vehicle is normally garaged. However, without the existence of an infrastructure of public charging station, the applications for PEVs will be limited to commuting and other short-distance travel. In this patent, a charging station is considered "public" if it is accessible and usable by plurality of drivers, as opposed to a private charging station located at a PEV owner's home. A "public" charging station is not necessarily accessible to any and all PEVs. Public charging stations may be disposed, for example at commercial buildings, shopping malls, multi-unit dwellings, governmental facilities and other locations.

In the U.S., charging stations usually comply with the Society of Automotive Engineers (SAE) standard, SAE J1772™. This standard refers to charging stations as "electric vehicle support equipment", leading to the widely used acronym EVSE. However, since the only support actually provided by an EVSE is charging, this patent will use the term electrical vehicle charging station or EVCS.

Typically, charge stations are first-come, first-served. That is, the first user that arrives at a station may use the station and continue to use the station until that user decides to leave. This rewards early arrivals at locations and is typical for normal parking spaces. However, this results in a sub-optimal allocation of a, typically, few charge station spaces to most users for a longer-than-necessary period of time.

For example, a user can leave his or her home fully-charged and arrive at a destination with nearly-full batteries. The user then parks in a parking space including a charge station and begins charging their electric vehicle. The electric vehicle is fully charged within one to three hours, but the user's car may remain in the spot for the remainder of the day. Meanwhile, other individuals with electric vehicles who arrived later or with lower battery charge levels are unable to access the charge station.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Figure 1:
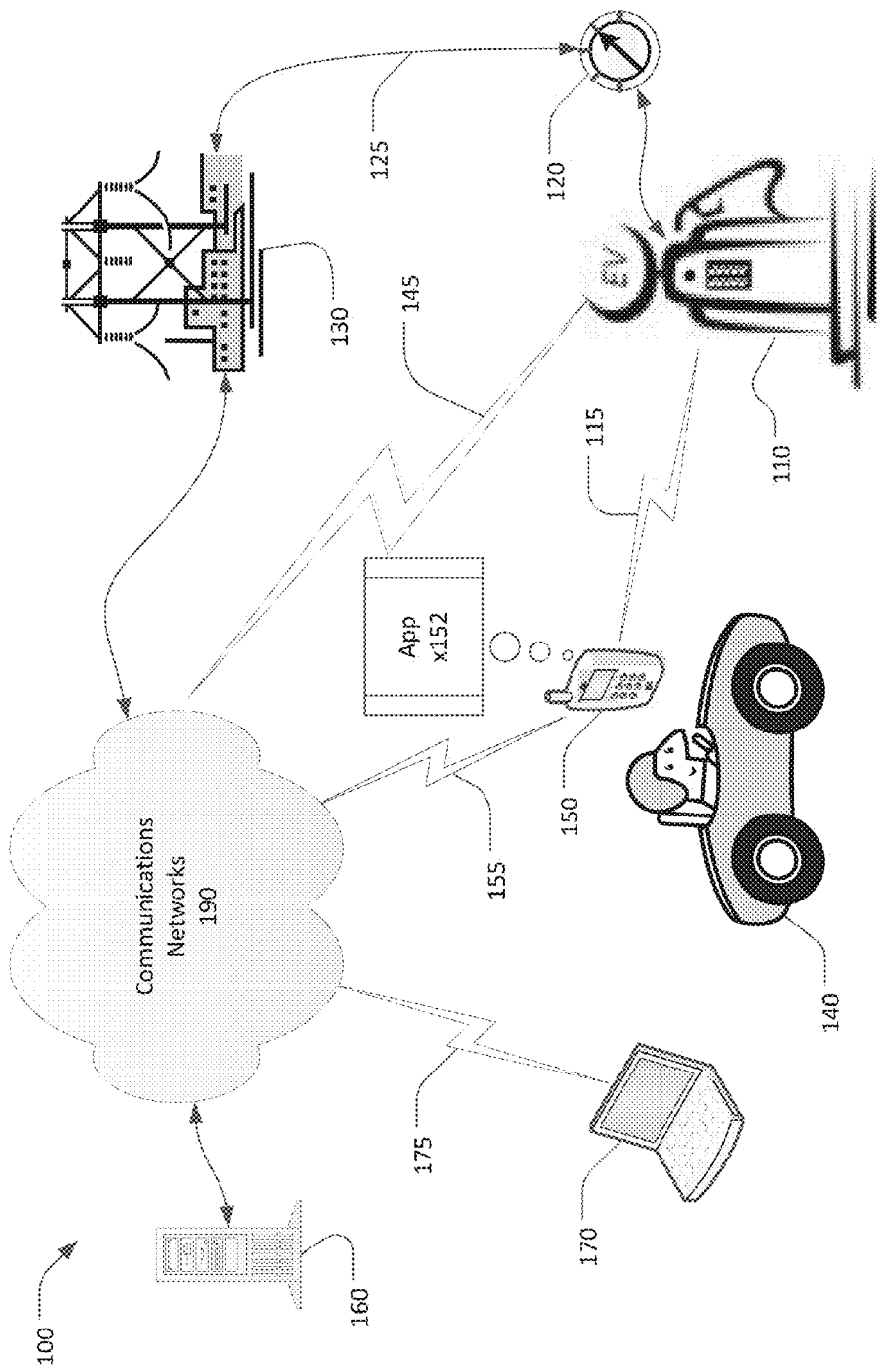
FIG. 1 is a block diagram of an environment for charging an electric vehicle.

Referring now to FIG. 1, an environment 100 for charging an electric vehicle 140 may include an EVCS 110 connected to a utility grid 130 via a meter 120. The EVCS may communicate with a driver's personal communications device (PCD) 150 over a first wireless communications path 115. The PCD may, in turn, connect to a network 190 over a second wireless communication path 155. The first wireless communications path 115 may use, for example, Bluetooth™, ZigBee™, or some other short-range wireless communications protocol. The second communications path 155 may use, for example, WiFi™ or a cell phone data communications protocol to connect to the network 190. The PCD 150 may be, for example, a smart phone, a tablet computer, a laptop computer, a computer operating as a part of the PEV or some other device capable of communicating with the EVCS 110 and the network 190.

The PCD 150 may run or access an application, or "app", 152 that enables the PCD to serve as a user interface for the EVCS 110. This app 152 may be web-based or compiled for use on the PCD. The EVCS 110 and the network 190 may communicate using a third communications path 145. This third communications path 145 may be wireless, as described above, or wired. If the third communications path 145 is wired, it may rely upon proprietary protocols or protocols based upon the OSI model. In some situations, the PCD 150 running the app 152 may also function as a bridge to provide bidirectional communications between the EVCS 110 and the network 190.

A server 160 may manage a network of vehicle charging stations including the EVCS 110. The server 160 may monitor the operation of the EVCS 110. The server 160 may manage billing and/or cost allocation for the use of the EVCS.

The server 160 may manage an authorization system to limit access to the EVCS to only authorized vehicles or drivers. The server 160 may also manage a reservation or queue system to allow authorized drivers to reserve future use of the EVCS 110. The server 160 may communicate with the EVCS 110 via the network and the PCD 150. Communications between the server 160 and the EVCS 110 may be intermittent and only occur when a PCD 150 running the app 152 is present.

A driver may communicate with the server 160 using their PCD 150 or using another computing device such as a personal computer 170 coupled to the network 190 by a wired or wireless communications path 175. The driver may communicate with the server 160, for example, to establish an account, to provide billing information, to make a reservation, or for some other purpose.

The meter 120 may be a conventional electric utility meter or a so-called "smart meter" that communicates with the utility grid 130 and the EVCS 110. The EVCS 110 may communicate with a smart meter 120, when present, using the same wireless protocol used to communicate with the PCD 150 or a different wireless communications protocol. The EVCS may communicate with the smart meter 120 using a power line communications PL protocol such as, for example, the IEEE 1901 protocol.

Figure 2:
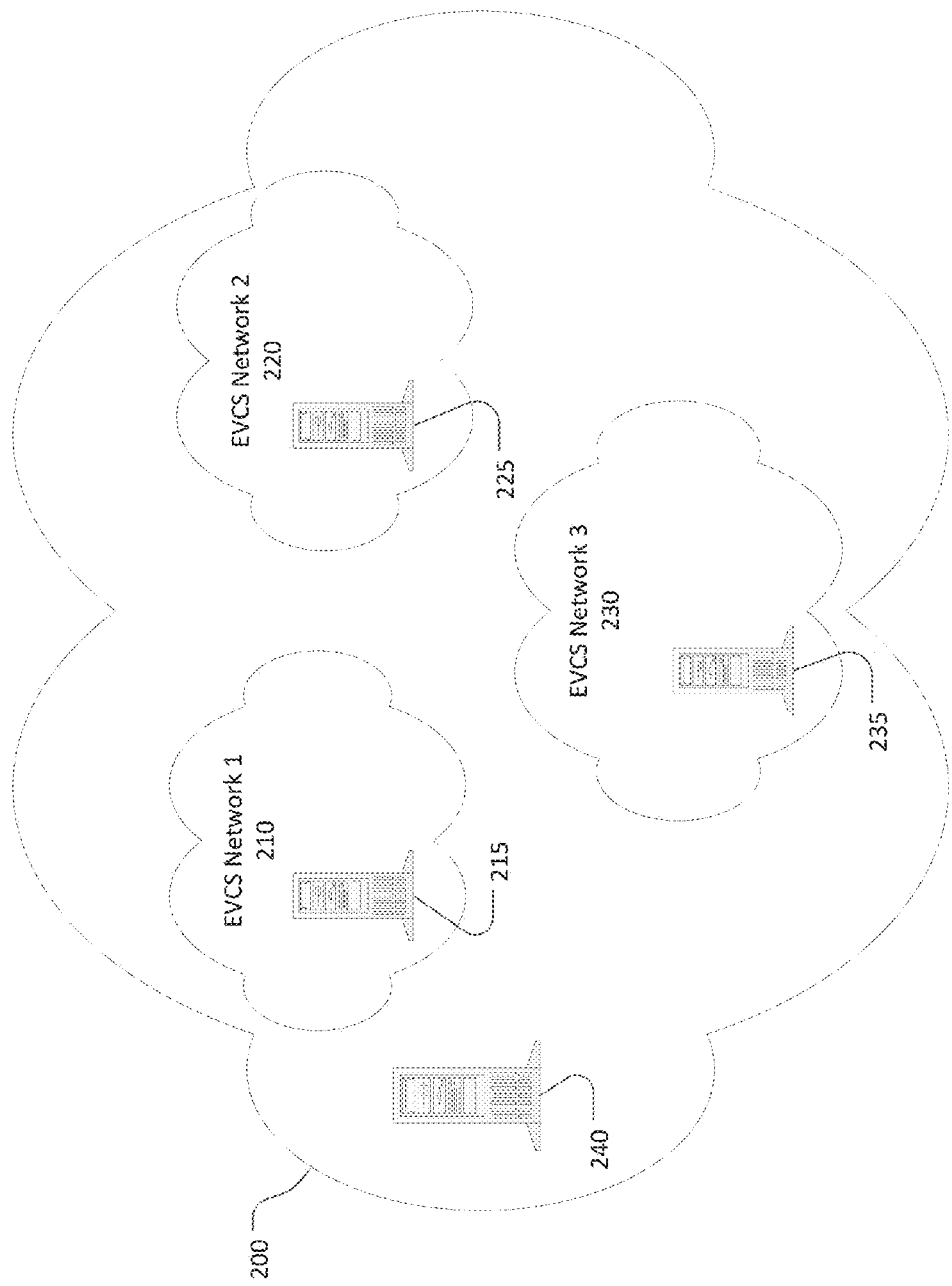
FIG. 2 is a block diagram of an electric vehicle charging station (EVCS) cloud.

Referring now to FIG. 2, a cloud 200 may support a plurality of EVCS management networks, each of with may operate, for example, as a virtual private network within the cloud 200. Three EVCS management networks 210, 220, 230 are shown in this example. A network may contain more or fewer than three EVCS management networks. Each of the EVCS management networks may be owned or operated by different business entities such as, for example, electric utility companies and manufacturers of EVCS equipment. The cloud 200 may include a physical or virtual server 240 to manage interactions between the EVCS management networks 210, 220, 230.

Each EVCS management network 210, 220 and 230 may include one or more EVCS operating at respective locations. Each EVCS management network 210, 220, 230 may include a respective server 215, 225, 235 to manage access, billing, and queuing for the one or more EVCS within the network.

The server 240 may communicate with each of the EVCS management networks 210, 220 and 230. The server 240 may manage transactions between the EVCS management networks 210, 220, and 230. For example, a customer or member of EVCS management network 1 210 may be at a location remote from any EVCS in network 1, and may need to access an EVCS within another EVCS management network. The customer may communicate with server 215 with in EVCS management network 1 210 to request access to an "out of network" EVCS. The servers 215 may then communicate with server 225 and/or server 235 via server 240 to gain customer access to an EVCS within EVCS management network 2 220 or EVCS network 3 230. Billing and payments for access to the out-of-network EVCS may be processed via the server 240.

Figure 3:
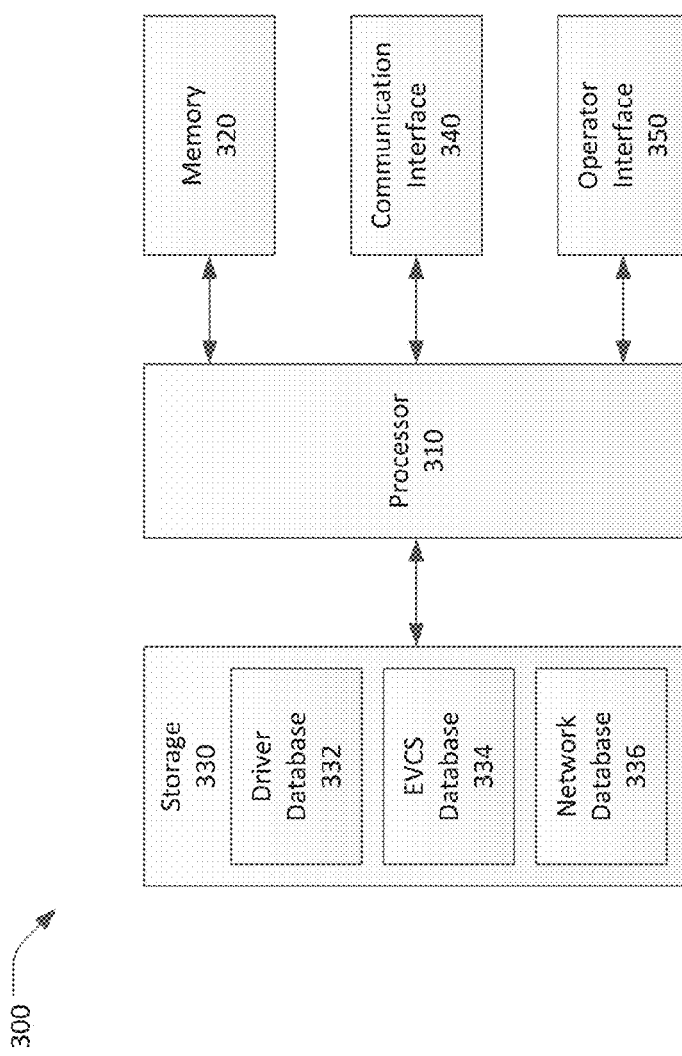
FIG. 3 is a block diagram of a computing device.

Turning now to FIG. 3, a block diagram of a computing device 300 is shown. The computing device 300 may be, for example, the server 160 or the server 240 of FIGS. 1 and 2, respectively. The computing device 300 includes a processor 310, memory 320, storage 330, a communications interface 340 and an operator interface 350. The storage 330 includes a driver database 332, an EVCS database 334 and a network database 336.

The processor 310 may include hardware, which may be augmented by firmware, for providing functionality and features described herein. The processor 310 may include one or more processor circuits such as microprocessors, digital signal processors, and graphic processors. The processor 310 may include other circuits such as logic arrays, analog circuits, and/or digital circuits.

The memory 320 may include static or dynamic random access memory, read-only memory, and/or nonvolatile memory such as flash memory. Information stored in the memory may includes a BIOS (basic input/output system) to initialize the processor 310, interim and final test data, and other data relating to ongoing operation of the processor 310.

The storage 330 may include one or more storage devices. As used herein, a "storage device" is a device that allows for reading and/or writing to a storage medium. These storage media include, for example, magnetic media such as hard disks, optical media such as compact disks (CD-ROM and CD-RW) and digital versatile disks (DVD and DVD±RW); flash memory devices; and other storage media. As used herein, the term "storage media" means a physical object for storing information. The term storage media does not encompass transitory media such as signals and waveforms.

Information stored in the storage 320 may include a driver database 332. The driver database 332 may contain information pertaining to drivers (or operators) of PEV that may access the computing device 300. The driver database 332 may include information, for each driver, such as a user name or other unique identification, an associated password, address information, billing information, a driver's real name, a driver's email address, a driver's mobile telephone number and a preferred method of contact. Additional or less information pertaining to a driver may be maintained by the driver database 332. For example, a driver's employment, VIP or group membership status may also be stored in the driver database 332.

The storage 330 may include an EVCS database 334. The EVCS database 334 may contain information pertaining to each of the EVCS that are serviced by the computing device 300. For example, in FIG. 2, each server 215, 225, 235 managed one or more EVCS within a respective EVCS management network 210, 220, 230. The EVCS database 334 may store information pertaining to the network address (if any) of each EVCS under its service, the capabilities of each EVCS, the current and projected use of each EVCS, any queue of users wishing to access each EVCS (in some cases a group of EVCS may be managed under a single queue, for example, at a location including multiple EVCS), the driver currently using each EVCS and any other information pertaining to each EVCS.

The storage 320 may include a network database 336 in addition to or instead of the driver database 332 and/or the EVCS database 334. The network database 336 may include data pertaining to communicating and managing transactions with one or more EVCS networks. The network database 336 may maintain authentication or other information necessary to enable this access. For example, the server 240 in FIG. 2 may include a network database containing information necessary to manage transactions between the EVCS management networks 210, 220, 230. The server 240 may not contain a driver database and/or an EVCS database since the server 240 may rely upon the servers 215, 225, and 235 within the respective EVCS networks to store driver and EVCS information.

Information stored in the storage 330 may also include program instructions for execution by the processor 310. The program instructions may be in the form of an application program, an applet (e.g., a Java applet), a browser plug-in, a COM object, a dynamic linked library (DLL), a script, or one or more subroutines. The program instructions may include an operating system such as, for example, variations of the Linux, Microsoft Windows®, Symbian®, Android®, and Apple® operating systems.

The communication interface 340 may include specialized circuits required to interface the computing device 300 with, for example, a network such as network 190 in FIG. 1, a PCD or a PEV. The communication interface 340 may include interfaces to one or more wired or wireless networks. The communications interface 340 may include, for example, one or more of an Ethernet™ interface for connection to a wired network, a Blue Tooth™ transceiver, a Zigbee™ transceiver, a WiFi™ transceiver, and/or a transceiver for some other wireless communications protocol. The communication interface 340 may be used to communicate information to and/or to receive information from a PCD or with a PEV that is or will be using an EVCS.

The operator interface 350 is used for an operator of the computing device 300 to interact with and to operate the computing device 300. The operator interface 350 may include a color or black-and-white flat panel display, such as a liquid crystal display, and one or more data entry devices such as a touch panel, a keyboard, and/or a mouse or other pointing device.

Figure 4:
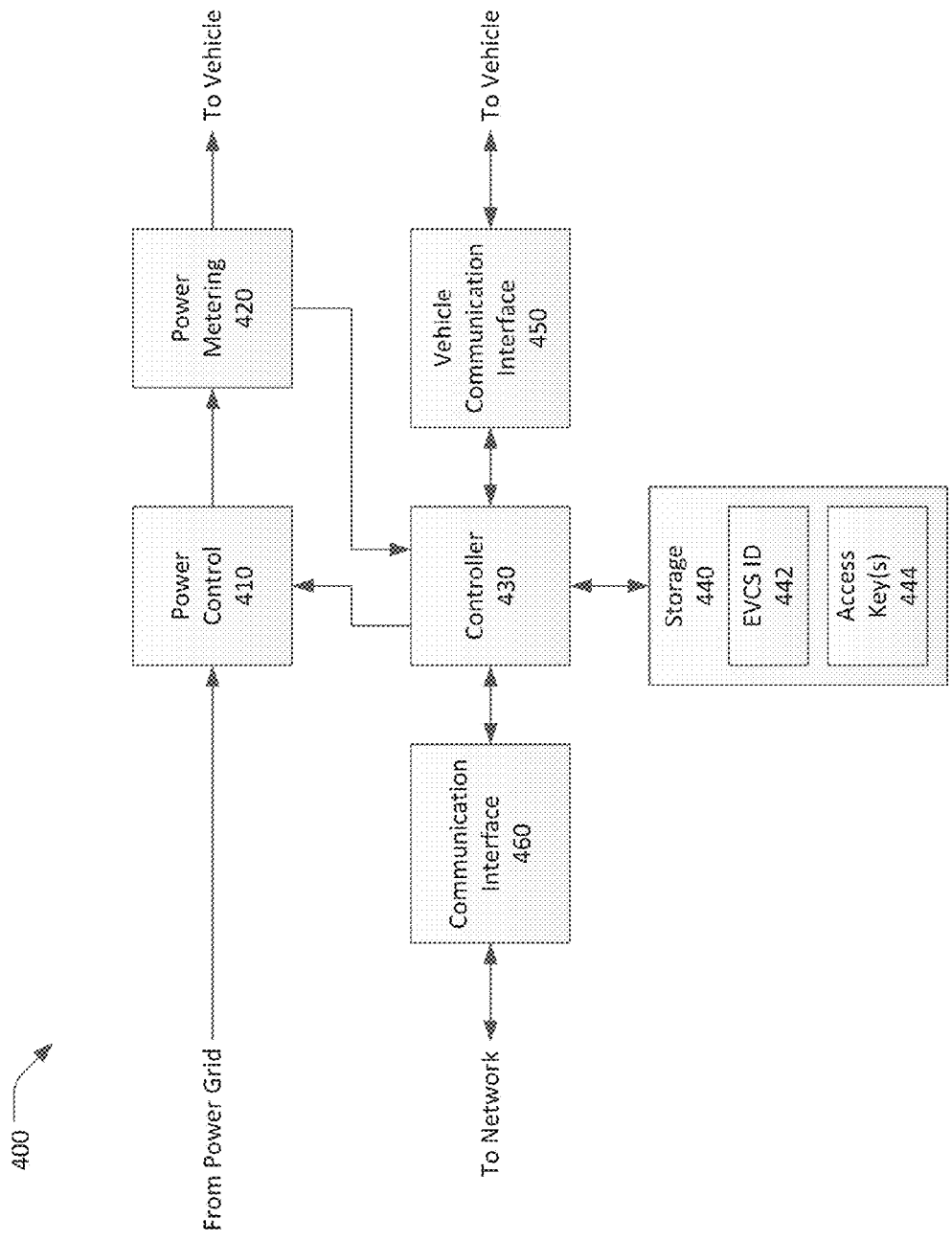
FIG. 4 is a block diagram of an EVCS.

Referring now to FIG. 4, a block diagram of an EVCS 400 is shown. The EVCS may include power control 410, power metering 420, a controller 430, storage 440, a vehicle communication interface 450, and a communication interface 460. The storage 440 may store data including an EVCS ID 442 and access key(s) 444.

The power control 410 handles the receipt of power from the power grid by the EVCS 400. The power control 410 is instructed by the controller 430 to direct power through the power metering 420 to a vehicle being charged by the EVCS 400. The power control 410 may be, for example, a relay or solid-state switch to either turn on or turn off the charging power to the vehicle in response to an instruction from the controller 430. The power metering 420 measures the current passing through the power control and accumulates the total charge or energy delivered from the EVCS 400 to the vehicle. This power metering 420 may be used in determining the appropriate cost to the operator of the vehicle.

The controller 430, which may be a computing device including one or more processors and memory, may communicate with vehicles, such as a PEV, using the vehicle communication interface 450. The vehicle communication interface 450 may, for example, provide a pilot line signal to the PEV in accordance with SAE J1772™. The vehicle communications interface 450 may communicate with vehicles in some other manner such as power line communications or wirelessly. Through the vehicle communication interface 450, the controller 430 of the EVCS may receive information from the vehicle indicating the current charge state of a PEV, the rate at which that charge state is changing for a PEV and, as a result, be able to estimate a time-to-full charge state.

The communications interface 460 may be used to communicate with the network and, by extension, with an EVCS server, such as the servers 215, 225, 235, in an EVCS network that includes the EVCS 400. The communications interface 460 may communicate with the network by way of a wired connection, such as an Ethernet connection. The communications interface 460 may communicate with the network by a wireless connection such as a WiFi™ local area network or a cellular telephone connection. The communication interface may communicate with the network directly or indirectly by way of a wireless connection to a driver's smart phone or other personal communication device.

The controller 430 may use the communications interface 460 to obtain data pertaining to drivers of PEVs, to obtain access to a queue of potential EVCS users, to transmit data pertaining to use of the EVCS by particular drivers and/or PEVs, and/or to communicate driver and billing information. For example, the EVCS may communicate to an EVCS server that the EVCS is no longer in use by the most recent driver. As a result, the EVCS server may respond with data pertaining to the next driver in the queue and to instruct the EVCS to limit access to only that next driver for a changeover period. The EVCS 400 may then use the communication interface 460 to notify the next driver, such as through simple message service or email, that the EVCS 400 is available for his or her use. Alternatively, the EVCS server may send such a notification in response to the EVCS communicating that the EVCS 400 is no longer in use.

The EVCS 400 also includes storage 440. The storage 440 provides nonvolatile storage of program instructions and data for use by the controller 430. Data stored in the storage 440 may include an EVCS ID 442 and one or more access key(s) 444. The EVCS ID 442 may be a unique identifier that is used to uniquely identify each EVCS in an EVCS network. The EVCS ID 442 may be, for example, a serial number, a MAC address, some other similar unique identifier, or a combination of two or more identifiers. The EVCS ID 442 may be derived by encrypting a serial number, a MAC address, some other unique identifier, or a combination of two or more identifiers. The EVCS ID 442 may be a random number or other identifier assigned by a remote device such as a server that manages an EVCS network containing the EVCS 400. The controller 430 may use the EVCS ID to uniquely identify the EVCS 400 to the network and/or PEVs using the communication interface 460 and the vehicle communication interface 450, respectively.

The access keys 444 may include one or more keys that allow a driver to charge a PEV at the EVCS 400. In order to charge a PEV, the driver must provide the EVCS 400 with an access key that matches one of the stored access keys 444. The access keys 444 may include, for example, an access key that allows unlimited use of the EVCS for charging and one or more restricted access keys that allow restricted use of the EVCS. A restrict use access key may be limited to, for example, a specific time window, a particular time of day, or one-time only use. A driver may present an access key to the EVCS 400, for example, by entering the access key using a keypad or other data entry device, or by communicating the access key wirelessly from a PCD.

The access key(s) 444 may also include one or more keys used by an administrator or maintenance personnel to, either remotely or directly at the EVCS 400, access maintenance and administrative features for the EVCS 400. For example, an administrator may be required to input an access key 444 in order to access administrator functions for the EVCS 400. In addition, the storage 440 may store software suitable to perform the various functions of the EVCS 400 described herein. The storage 440 may also store data pertaining to usage of various PEVs and associated users such that billing may be properly reported to, for example, an EVCS server. The storage 440 may also store a periodically updated queue of users waiting to gain access to the EVCS.

Figure 5:
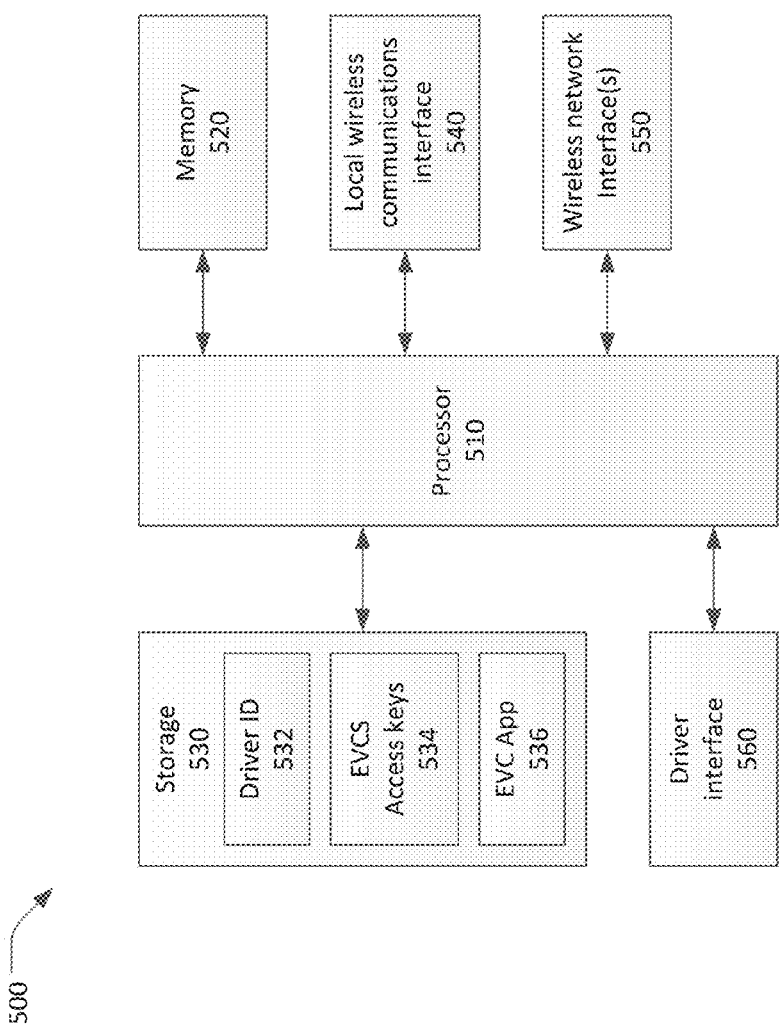
FIG. 5 is a block diagram of a personal computing/communications device.

FIG. 5 shows a block diagram of a personal computing/communications device 500 (a "PCD"). The PCD 500 includes a processor 510, memory 520, storage 530, local wireless communications interface 540, wireless network interface(s) 550 and a driver interface 560. The driver interface 560 may be, for example, a touch screen display or some other combination of a display and a data input device such as a keypad and/or a pointing device.

The local wireless communications interface 540 may be, for example, a Bluetooth™, Zigbee™ or wireless local area network interface that can connect within a short distance of the PCD 500. This local wireless communications interface 540 may be used, for example, to connect to an EVCS, such as the EVCS 400, in order to exchange data pertaining to the EVCS.

The wireless network interface(s) 550 may be one or more interface usable to send and receive data over a long-range wireless communication network. This wireless network may be, for example, a mobile telephone network with data capabilities and/or a WiFi™ local area network or other wireless local area network.

The processor 510 and memory 520 serve substantially similar functions to the processor 310 and memory 320 in FIG. 3. The storage 530 may serve substantially similar functions to the storage 330 in FIG. 3. The storage 530 may store a driver ID 532, one or more EVCS access keys 534, and an electric vehicle charging application (EVC App) 536.

The driver ID 532 may be, for example, provided by an EVCS server or related web-based software. The driver ID 532 uniquely identifies the operator of the PCD 500 to an EVCS. The driver ID 532, therefore, may be used to enable EVCS charging to an intended operator of the PCD 500 and may enable billing for EVCS services to the correct individual. The driver ID 532 may be transmitted to an EVCS (to be forwarded on by the EVCS to an EVCS server) using the wireless network interface(s) 550.

The EVCS access keys 534 may enable a driver in possession of the PCD 500 to access an EVCS such as the EVCS 400 in order to charge a PEV. Upon receiving a request to charge a PEV, the EVCS may require the driver to submit both a driver ID and an Access Key, and may provide the charging service only if the submitted access key matches an access key stored within the EVCS.

When executed, the EVC App 536 may cause the PCD 500 to serve as an interface between the driver and the EVCS. For example, the EVC App may cause a graphical user interface (GUI) for the EVCS to be presented on the driver interface 560. The driver may then use the GUI to request charging services from the EVCS. The EVC App 536 may also cause the PCD to provide the charging service request, the driver ID 532 and an EVCS access key to the EVCS using either the local wireless communications interface 540 or a wireless network interface 550.

Description of Processes

Figure 6:
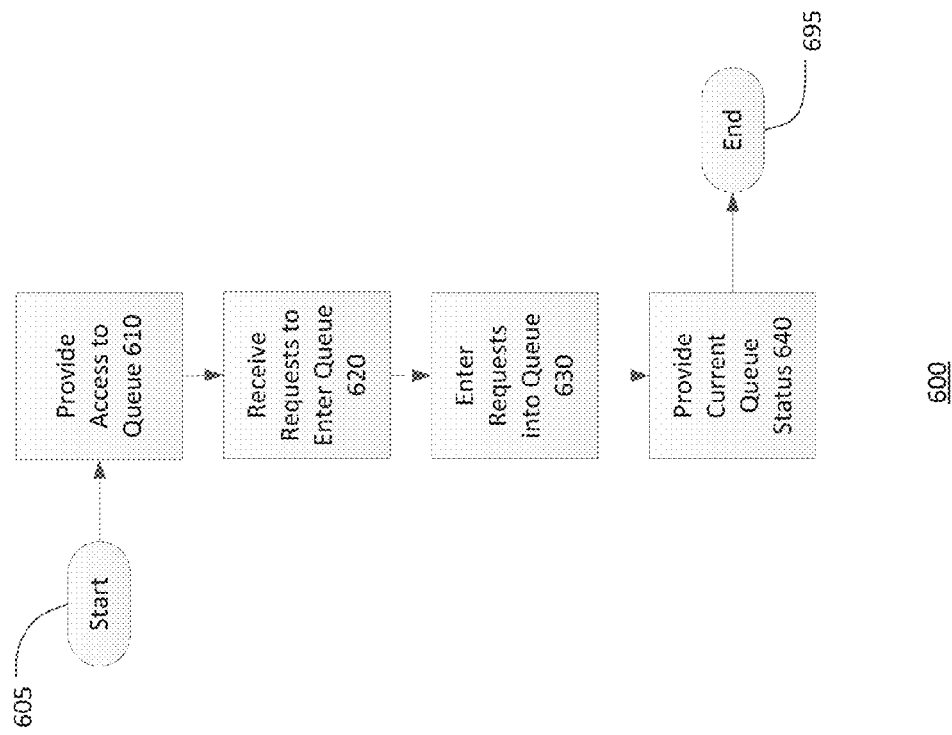
FIG. 6 is a flowchart of the process of entering the electric vehicle charging station queue.

Referring now to FIG. 6, a flowchart 600 of the process of entering the electric vehicle charging station (the "EVCS") queue is shown. The flow chart 600 has both a start 605 and an end 695, but the process may be cyclical in nature. Many instances of the process may be taking place serially or in parallel.

First, an EVCS server, such as server 160 or server 240, provides access to a queue at 610. Interactions with the ECVS server, such as this access may be provided through a PCD such as or including a web-based application, through a mobile smartphone application, through a telephonic guided interaction with an automated system, using the electric vehicle charging station itself, through an interactive system in an electric vehicle or through other, similar devices. Through the interaction, a driver (or "vehicle operator" or "user") interacting with the EVCS server may be able to review the current status of the queue, for example, to obtain an estimate of the time that the EVCS could be available for use by his or her PEV. The terms "vehicle operator," "driver" and "user" refer to the operator of or someone acting on behalf of the operator of a particular PEV that may be charged using the EVCS.

The PCD may also provide information or the capability to perform additional actions. For example, a user may obtain an estimated time to charge his or her vehicle or may be given an option to pay a premium for a higher placement in the queue. The access to the queue may include access to information regarding the current state of the queue or the EVCS—for example, the number of others in the queue, the capabilities of the EVCS or other, related information.

Next, the ECVS server receives a request from the driver to enter the queue at 620. The request may incorporate information pertaining to the vehicle or to the user. This information may be automatically obtained, associated with a pre-existent account or an account created during the request process and may include data derived from a mobile device associated with the vehicle or driver. For example, the information may include the current location or current charge of a vehicle. The information may also include a unique identification associated with the driver that may indicate that the driver is associated with a particular group, is an employee of a particular company or entity, that the driver has prepaid or is willing to pay a premium for greater access to this or a group of ECVS. This information may be used by the ECVS server to prioritize the queue.

The ECVS server then enters the requests into the queue at 630. Specifically, user identification associated with the vehicle and/or associated user is entered into the ECVS queue. The user identification may be entered at the end of the queue.

Finally, the ECVS server may provide the current status of the queue 640 to the driver. This status may be provided via the access device and may provide a full listing of the queue or may simply provide a position in the queue or an estimated time at which the driver's vehicle may gain access to the ECVS.

Figure 7:
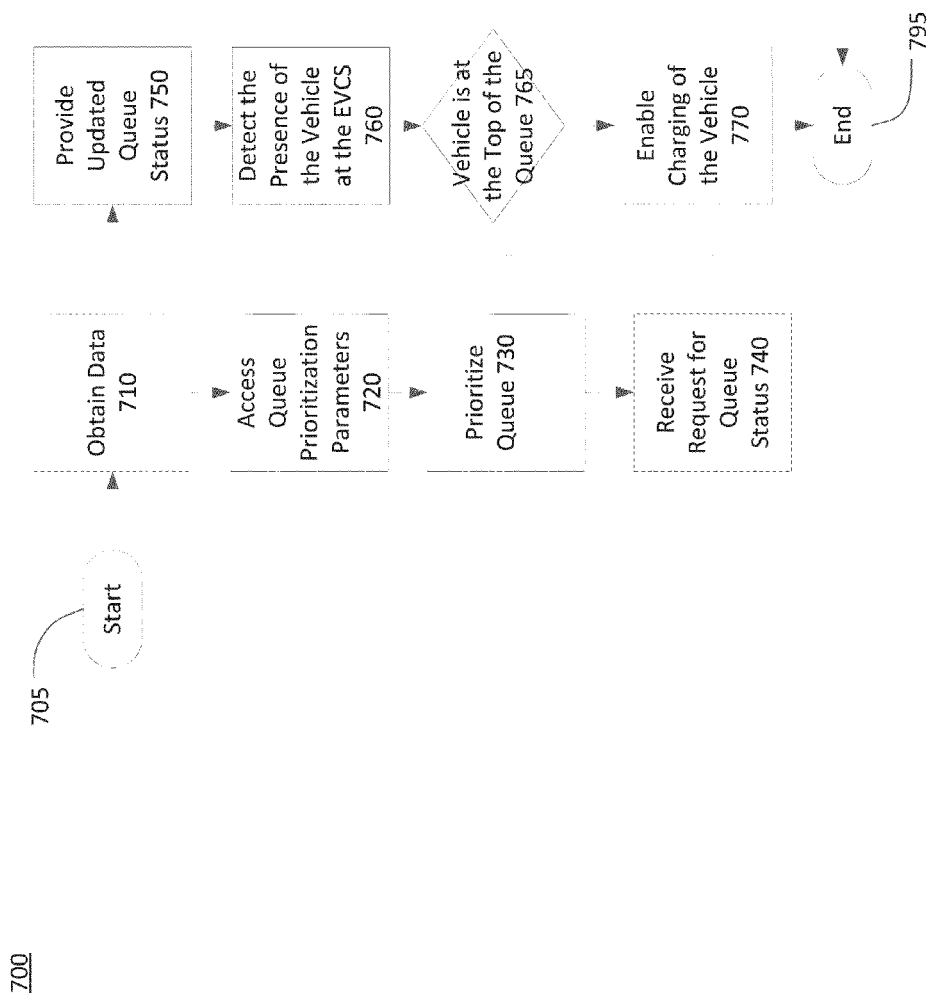
FIG. 7 is a flowchart of queue prioritization for the electric vehicle charging station queue.

Turning now to FIG. 7, a flowchart of queue prioritization for the electric vehicle charging station queue is shown. The process optionally begins by obtaining data from the vehicle and/or user at 710. Examples of this data may be seen in FIG. 8. As discussed above, this data may be transmitted simultaneously with the request to enter the queue or it may be obtained after the driver identification has been entered into the queue at 710. The data, such as user pre-payment information, group memberships, employment status and similar information, may be obtained in whole or in part from storage associated with the ECVS server or a driver's PCD. In some situations, this data may not be obtained from a vehicle and/or user at all.

Next, the system accesses the queue prioritization parameters at 720. An example of prioritization parameters may be seen in FIG. 9. These parameters are input by an ECVS operator, such as an owner, installer, maintenance or management company associated with the on-going operation of the ECVS. In some cases, the EVCS operator may be an employer who has installed one or more ECVS in a parking lot associated with their company. In other cases, the EVCS operator may be the operator of a parking lot or set of parking spaces associated with a particular shopping area, concert or event venue, a public municipality or other public entity.

These queue prioritization parameters define the attributes of the vehicle and/or user that will affect the queue prioritization. These attributes, as discussed more fully below, may include the time of arrival of a vehicle, the current charge of the vehicle, the time necessary to charge a vehicle, the pre-payment of premium payment status of a driver, the driver's membership in a particular group or the driver's employment status with the EVCS operator, a related entity or as an employee of an entity paying the EVCS operator for priority access to one or more EVCS. These are all examples of queue prioritization parameters that may be input by an EVCS operator and may be considered by an EVCS server in performing queue prioritization.

Using these queue prioritization parameters and the vehicle and/or user data, the queue is prioritized at 730. This queue prioritization may take place, as with the other aspects of this process, on an EVCS server or directly on an EVCS with access to the appropriate parameters, either locally or by communication with an EVCS server. This prioritization takes into account the EVCS operator-set parameters in order to prioritize the potential users who have entered the queue based upon the vehicle and/or user data.

For example, if the EVCS operator has determined that VIP drivers who have prepaid should always obtain the top spot in the queue. In such an instance, all drivers meeting those criteria will be moved to the top of the queue. The queue prioritization parameters may indicate that employees of entities served by the parking lot (in some cases a single entity) will receive secondary placement in the queue. In other cases, the EVCS operator may indicate in queue prioritization parameters that drivers arriving (or scheduled to arrive) at earlier times will be given priority in the queue.

Figure 9:
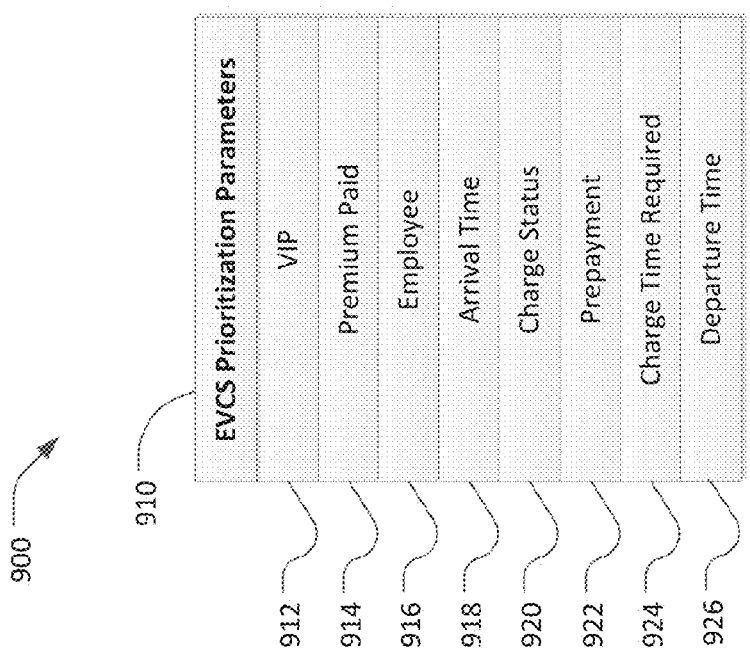
FIG. 9 is an example of electric vehicle charging station prioritization parameters.

The EVCS operator may set queue prioritization parameters in a simple priority-per-parameter system (see, e.g. FIG. 9). However, the EVCS server is also capable of more complex arrangements, for example, weightings may be provided to individual parameters such that an overall weight of each vehicle and driver combination may be calculated to thereby determine each vehicle's placement in the queue. Alternatively, more complex computations may be made such that queue prioritization parameters are evaluated using a function or are weighted only when certain preconditions are met.

For example, VIPs may always receive top spots in the queue unless and until there is an employee with a so-designated "low" charge who has asked to join the queue at which point that employee will be granted the highest priority or, at least, a higher priority in the queue. Similarly, once no VIP remains in the queue, then a second parameter may indicate that pre-paid drivers are to receive top billing, ordered based upon the respective current charge of their vehicles or based upon their arrival time. The ECVS server is capable of performing queue prioritization based upon virtually any permutation of the parameters and the vehicle and/or user data.

Next, the ECVS server may receive a request for an update as to the queue status, for example, through a smartphone application. This request is optional because the request need not be made by a driver. The driver at the top of the queue will be provided with an updated queue status at 750 automatically once the EVCS is available for charging by the PEV.

This update may take the form of a notification in a smartphone application, an email or a simple message service (SMS) message to a mobile phone associated with the driver. Substantially simultaneously, the current user of the EVCS may be notified that he or she has to vacate the EVCS. Monetary or reduced service penalties may be implemented by the EVCS for users who do not promptly vacate EVCS.

Time frames during which the notified driver must begin using the EVCS or risk losing his or her place in the queue may be implemented. In this way, the EVCS queue is managed appropriately. For example, a time limit of fifteen minutes after notification that the EVCS is available for use by a driver currently at the top of the queue may be set. Failure to arrive after fifteen minutes may result in the next driver in the queue receiving a notification that the EVCS is now available for their use.

The presence of the PEV at the top of the queue at the EVCS is then detected by the EVCS at 760. This detection of the PEV may take place using one or more Bluetooth™ near field communications, wireless Internet, global positioning system, credit card input into the EVCS, a barcode or QR code scannable by the ECVS and similar communications and location-based capabilities. In the most typical example, a smartphone associated with the user may move within a few tens of feet of the ECVS, the location of the smartphone being detected by the mobile application operating on the smartphone utilizing GPS capabilities within the smartphone. Alternatively, the PEV itself may incorporate Bluetooth™, wireless Internet, or other communication capability that enables it to report to the ECVS that it is within range of the ECVS. Plugging in the PEV to the ECVS may enable data communication between the vehicle and the ECVS that identifies the PEV and/or driver to the ECVS. At this point, if the driver is at the top of the queue at 765, then the ECVS enables charging of the PEV at 770.

Figure 8:
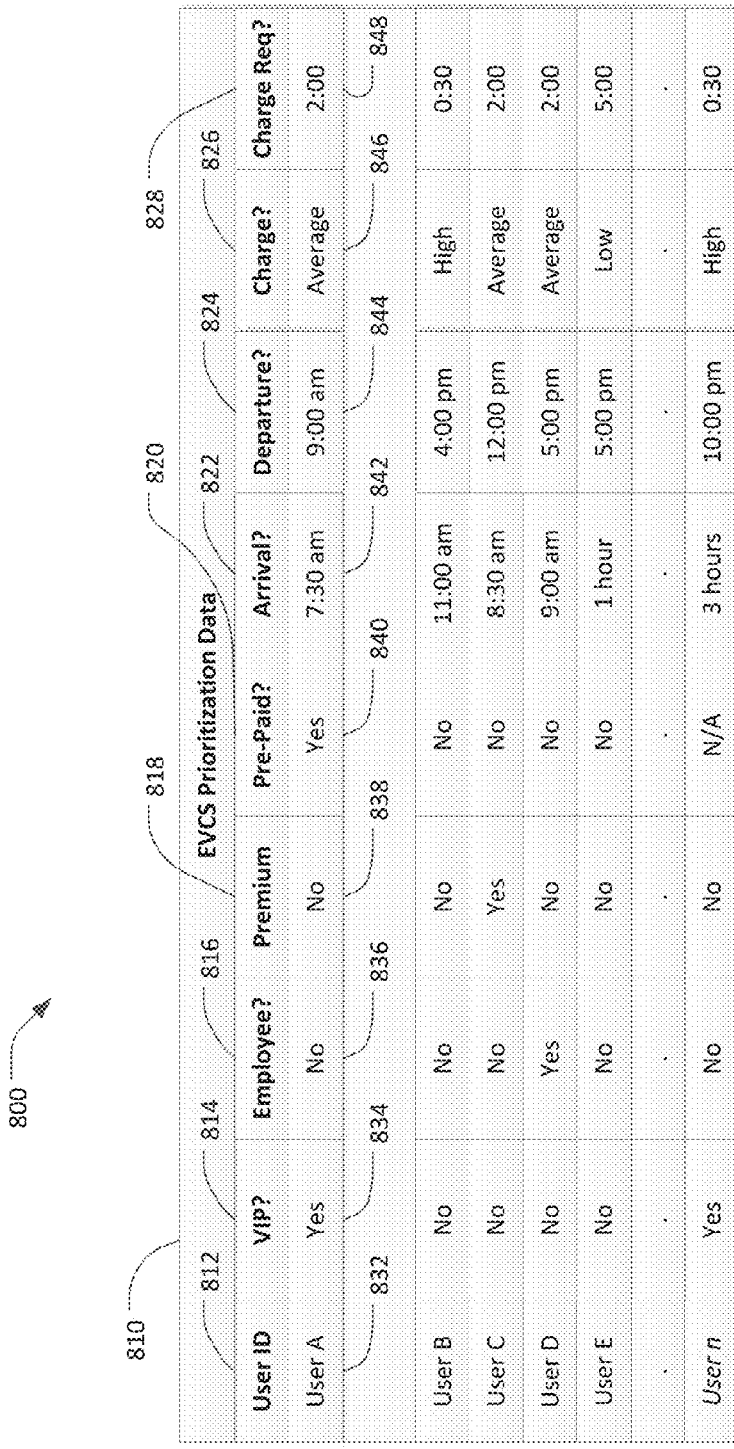
FIG. 8 is an example of electric vehicle charging station prioritization data.

Referring now to FIG. 8, an example of electric vehicle charging station prioritization (the "EVCS") data 800 is shown. The data is presented as an example in table 810, however, the data is maintained in a database. The EVCS prioritization data is maintained in such a way that it is accessible to both the EVCS server and to the ECVS.

The data includes information, organized into columns in the table 810, such as the user (driver) identification 812, the VIP status 814 of the user, the employment status 816 of the user, the premium payment status 818 of the user, the prepayment status 820 of the user, the arrival time 822 of the user, the departure time 824 of the user, the charge 826 of the user's vehicle and the charge time required 828 of the user's vehicle. A gap is shown in the table 810 so that prioritization data associated with User A 832 may be labeled more easily. This gap is not representative of any actual gap in the data or any other aspect of the table 810.

The user identification 812, for example, User A 832, is a unique identification associated with a particular user and/or PEV. The user identification 812 may be chosen by a user, for example a login and password combination. Alternatively, the user identification 812 may be an automatically-assigned number. Still further alternatively, the user identification 812 may be associated with a particular PEV, such as a vehicle identification number (VIN), license plate number, a MAC address associated with a PEV's built-in computer systems, or a Bluetooth™ ID. Still further alternatively, the same data may be input using, associated with or stored upon a user's PCD.

The user identification may be provided, for example, by a user using a smartphone application to request access to the queue and/or may be automatically filled-in by a user's smartphone or other device when the request is made. Additional data, including the EVCS prioritization data 800 may also be provided simultaneously with the user identification.

The VIP status 814 of the user is an indication that the user is a "very important person." The VIP status 814, such as VIP status 834, is an indication that the User ID 832 is associated with a user that is "very important" in some regard. This may be, for example, an executive in a company that provides the ECVS, an individual who has temporarily or permanently been given priority access to this (and potentially other) ECVS. The very important person may be an individual with disabilities who has difficulty returning to his or her PEV repeatedly to gain access to the ECVS and, as a result, has been given VIP status 814. This status may be set by the ECVS operator.

The employment status 816, such as employment status 836, is an indication whether or not the User identification 812 is associated with an employee of the EVCS operator or with a related entity. For example, a parking lot operator may provide priority access to EVCS for their employees. Alternatively, the same parking lot operator may provide priority access to EVCS for employees of companies that, collectively, lease a number of parking spots from the parking lot operator. Still further alternatively, security guards or maintenance personnel for the EVCS operator, particularly those that use PEVs, may be classified as "employees" so that they can gain ready access to the EVCS as the need arises.

The premium payment status 818 of the user, such as premium payment status 838, indicates whether or not a user associated with the User ID 832 has paid a premium for higher priority in the queue. If the user has paid a premium, for example, becoming a "monthly member" of a group that operates a number of EVCS or by paying a premium or indicating a willingness to pay a premium, at the time the user requests entry into the queue.

The pre-payment status 820 of the user, such as prepayment status 840, indicates whether or not the user associated with the User ID 832 has pre-paid for access to the EVCS. This may take the form of a monthly payment, yearly payment or of pre-payment before access to the EVCS is granted. This prepayment may be completed, for example, using a smartphone and associated application. Prepayment may be completed on a regular basis or may take place as the user is requesting to be entered into the queue.

The arrival time 822 of the user, such as arrival time 842, indicates the time at the EVCS (or near the EVCS) the user associated with User ID 832 arrived or will be arriving. In some implementations, the first users to enter the queue may be those "arriving" first. In other implementations, the first users near the EVCS or who will be nearest the EVCS will be "arriving" first. Arrival time 822 is useful in that those arriving later are unable to access the EVCS until they arrive and, may be disregarded in some implementations, at least until they have or soon will arrive.

In addition, arrival time may preemptively effect the queue prioritization. For example, as a VIP, prepaid, employee's arrival time approaches, the queue may be reprioritized such that a user currently using the EVCS may receive a notification that his or her access to the EVCS has now ended and requesting that the current user vacate a parking spot associated with the EVCS in order to make way for the much higher priority individual as they arrive.

The departure time 824, such as departure time 844, is the time at which the user associated with the User ID 832 will be or is projected to be leaving the EVCS. The departure time 824 also may be used to determine how best to prioritize the queue. For example, if a particular user has a very low battery and will be leaving soon, then that user may be given priority over other users of otherwise similar priority in the queue. This may be the difference, for example, of a user making it back home and of having to stay late to ensure an adequate charge to make the trek. In addition, if a particular user will be at or near an EVCS much longer than the others, that user has more flexibility and priority in the queue may be adjusted accordingly such that the later user gains priority as his or her departure time draws nearer.

The charge 826 of the user's PEV, such as charge 846, identifies the current charge level of the vehicle associated with the User ID 832. The charge 826 may be exact, such as 85% or 2 hours remaining. Alternatively, the charge 826 may be generalized, such as "high," "average" or "low." The respective charges associated with users may be used as EVCS prioritization data so that those users whose PEVs have the lowest charge may obtain priority access to the EVCS. In this way, users whose PEVs have the lowest charge can be assured that they will have priority over users whose PEVs are near fully charged.

The charge time required 828 of the user's PEV, such as charge time required 848, is an estimate of the time required to fully charge the PEV associated with User ID 832. Vehicle battery capacities and charge rates can vary widely. This information may be obtained, for example, from the PEV itself, once plugged into the EVCS or based upon a historical analysis of data pertaining to a particular PEV or a particular make and/or model of PEV.

Regardless of how obtained, the estimated time may be used to prioritize the queue. If a user is leaving within an hour, but only requires a thirty-minute charge time, then that user may still be given high priority in the queue. If a user requires a 5 hour charge and there are many others with higher priority in the queue, then that user may be advised of the status of the EVCS queue and opt to pursue a charge elsewhere because of the low priority that that user is given in the busy EVCS queue.

Any of these EVCS prioritization data may be used or remain unused by an EVCS operator. In addition, less or still more data may be required and may be used in making queue prioritization determinations. The data types identified above are merely intended to be examples of the types of EVCS prioritization data that may be used by an EVCS in determining how best to prioritize an EVCS queue.

Turning now to FIG. 9, an example of electric vehicle charging station (the "EVCS") prioritization parameters 900 is shown. The prioritization parameters 900 are shown in table 910. In this example, the parameters 900 are greatly simplified such that each parameter is ranked according to its, respective priority. So, VIP status 912 is of a higher priority than paying a premium 914, which is in turn higher priority than being an employee 916, which is a higher priority than arrival time 918. Similarly, the charge status 920 is of a higher priority than prepayment 922 which is of a higher priority than charge time required 924 which is of a higher priority than departure time 926.

As discussed briefly above, the prioritization parameters may be much more complex and may take the form of a scripting language including if, then, and case statements dependent upon the prioritization parameters. For example, VIP status 912 may be of primary importance, but a combination of a low current charge status 920 and being an employee 916 may trump any other status. Similarly, an employee with an early arrival time 918 and early departure time 926 with a low current charge status 920 may take precedence over everything but VIP status 912. An operator may choose to prioritize higher-paying or already-paying users over everything else in order to maximize paying customers. Various permutations and combinations of the prioritization parameters 900 may be used by an EVCS operator.

However, the ways in which the prioritization parameters are applied are determined by the EVCS operator or a management company or individual associated with or designated by the EVCS operator. In this way, the typical way of allocating EVCS availability, first-come, first-served is overcome with a more intelligent allocation of the scarce EVCS resources. A scripting, wizard or user-interface-guided environment may be provided to the EVCS operator to enable the EVCS operator to more easily generate rules pertaining to the EVCS queue prioritization parameters.

Figure 10:
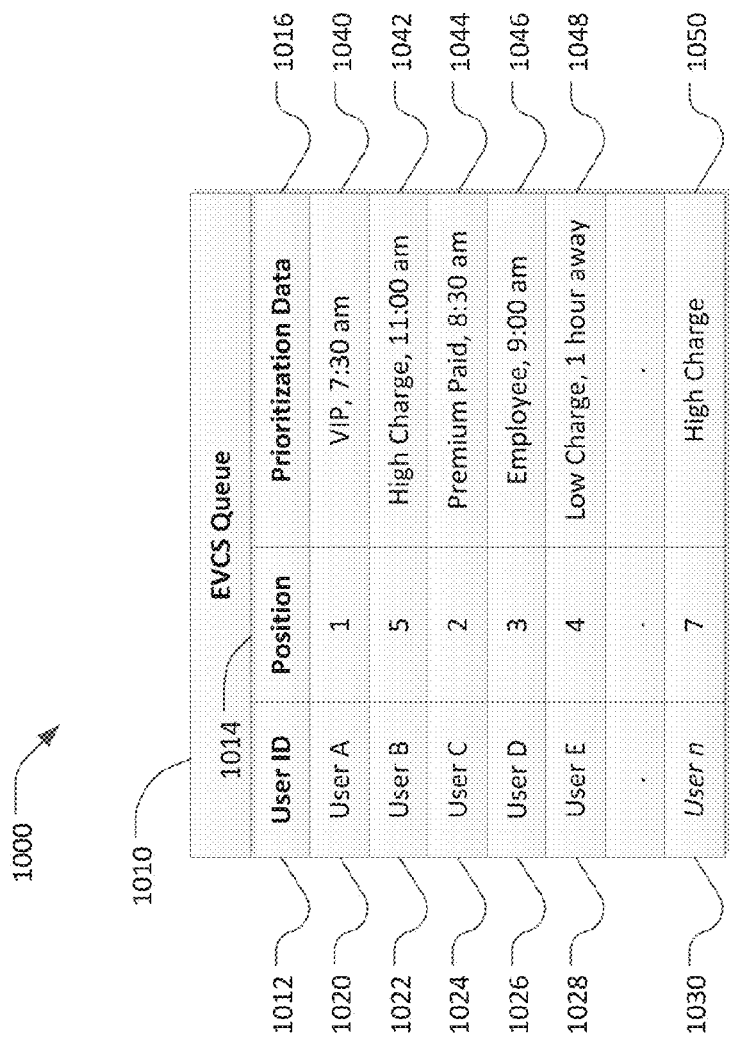
FIG. 10 is an example queue and associated prioritization parameters.

Referring now to FIG. 10, an example queue 1000 and associated data is shown in table 1010. The User ID 1012, position 1014 and prioritization data 1016 are shown in table 1010.

User A 1020 is in position 1 based upon the prioritization data 1016 including VIP status and an arrival time at 7:30 am. User C 1024 is in position 2 based upon a prioritization data 1044 including a premium paid and arrival at 8:30 am. User D 1026 is in position 3 based upon prioritization data 1046 including employment and an arrival time of 9:00 am. User E 1028 is in position 4 based upon prioritization data 1048 of a low charge and an arrival time of one hour in the future. User B 1022 is in position 5 based upon prioritization data 1042 including a high charge and an 11:00 am arrival time. Finally, User n 1030 is in position 6 based upon prioritization data 1050 including, only, a high charge.

As additional users enter the queue or as prioritization data changes, the relative position of the users may be updated in real-time based upon the prioritization parameters selected by the EVCS operator.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of queue prioritization for an electric vehicle charging station comprising:
   providing remote access to a queue for the electric vehicle charging station, the queue defining an order for electric vehicles to be charged at the electric vehicle charging station;
   receiving a plurality of requests to utilize the electric vehicle charging station;
   entering those requests into the queue;
   prioritizing the queue based upon parameters determined by an operator of the electric vehicle charging station, the parameters including a current charge state of each electric vehicle and a membership of each vehicle operator;
   notifying a vehicle operator of a position at a top of the queue; and
   enabling the electric vehicle charging station to begin charging a vehicle operated by the vehicle operator upon confirmation that the vehicle is present at the electric vehicle charging station.

2. The method of claim 1 wherein the remote access is provided via a selected one of a wireless Internet network, a mobile telephone network, a Bluetooth connection, and an infrared connection.

3. The method of claim 1 wherein the parameters further include at least one of (1) a time at which each of the plurality of requests was entered, (2) a relationship with the operator of the electric vehicle charging station, (3) a prepayment by the vehicle operator, (4) a willingness of the vehicle operator to pay a premium for priority in the queue, (5) an employment status of the vehicle operator, and (6) a current location of the vehicle relative to the electric vehicle charging station.

4. The method of claim 1 wherein the parameters are compared with data obtained from communication with the vehicle.

5. The method of claim 4 wherein the data obtained from communication with the vehicle includes at least one of (1) a current charge state, (2) an estimate of the range of the vehicle at the current charge state, (3) an estimate of the time to full charge, and (4) an estimate of a length of time necessary to reach a pre-determined charge state.

6. The method of claim 1 wherein the notifying the vehicle operator includes communicating with an external server that maintains the queue using a mobile communication device operated by the vehicle operator.

7. The method of claim 6 wherein the mobile communication device is a selected one of (1) a mobile telephone operated by the vehicle operator and (2) the vehicle.

8. The method of claim 7 wherein the electric vehicle charging station transmits data to the mobile communication device which is then transported by the vehicle operator to a location where the data may be transmitted to the external server.

9. The electric vehicle charging station of claim 8 wherein the mobile communication device receives responsive data from the external server and further wherein charging is enabled only upon receipt of the responsive data.

10. The electric vehicle charging station of claim 9 wherein the responsive data includes confirmation of payment for charging the vehicle.

11. An electric vehicle charging system comprising:
    an electric vehicle charging station, suitable for charging an electric vehicle;
    a computing device for:
       entering received requests for use of the electric vehicle charging station into a queue defining an order of electric vehicles to be charged at the electric vehicle charging station;
       prioritizing the queue based upon parameters determined by an operator of the electric vehicle charging station, the parameters including a current charge state of each electric vehicle and a membership of each vehicle operator;
       enabling the electric vehicle charging station to begin charging a vehicle operated by a vehicle operator upon confirmation that the vehicle is present at the electric vehicle charging station; and a communications system for receiving requests to enter the queue and for transmitting information to vehicle operators regarding the status of the queue.

12. The electric vehicle charging station of claim 11 wherein the communications system includes a selected one of a wireless Internet network, a mobile telephone network, a Bluetooth connection, and an infrared connection.

13. The electric vehicle charging station of claim 11 wherein the parameters further include at least one of (1) a time at which each of the plurality of requests was entered, (2) a relationship with the operator of the electric vehicle charging station, (3) a prepayment by the vehicle operator, (4) a willingness of the vehicle operator to pay a premium for priority in the queue, (5) an employment status of the vehicle operator, and (6) a current location of the vehicle relative to the electric vehicle charging station.

14. The method of claim 11 wherein the parameters are compared with data obtained from communication with the vehicle.

15. The method of claim 14 wherein the data obtained from communication with the vehicle includes at least one of (1) a current charge state, (2) an estimate of the range of the vehicle at the current charge state, (3) an estimate of the time to full charge, and (4) an estimate of a length of time necessary to reach a pre-determined charge state.

16. The electric vehicle charging station of claim 11 wherein the communications system communicates with an external server that maintains the queue using a mobile communication device operated by the vehicle operator.

17. The electric vehicle charging station of claim 16 wherein the mobile communication device is a selected one of (1) a mobile telephone operated by the vehicle operator and (2) the vehicle.

18. The electric vehicle charging station of claim 17 wherein the electric vehicle charging station transmits data to the mobile communication device which is then transported by the vehicle operator to a location where the data may be transmitted to the external server.

19. The electric vehicle charging station of claim 18 wherein the mobile communication device receives responsive data from the external server and further wherein the computing device only enables the electric vehicle charging station to begin charging upon receipt of the responsive data.

20. The electric vehicle charging station of claim 19 wherein the responsive data includes confirmation of payment for enabling the electric vehicle charging station to begin charging the vehicle.

* * * * *